Jan. 8, 1935.            H. J. L. FRANK              1,986,965
                      WIRING DUCT AND FITTINGS
                   Filed Sept. 26, 1929      3 Sheets-Sheet 1
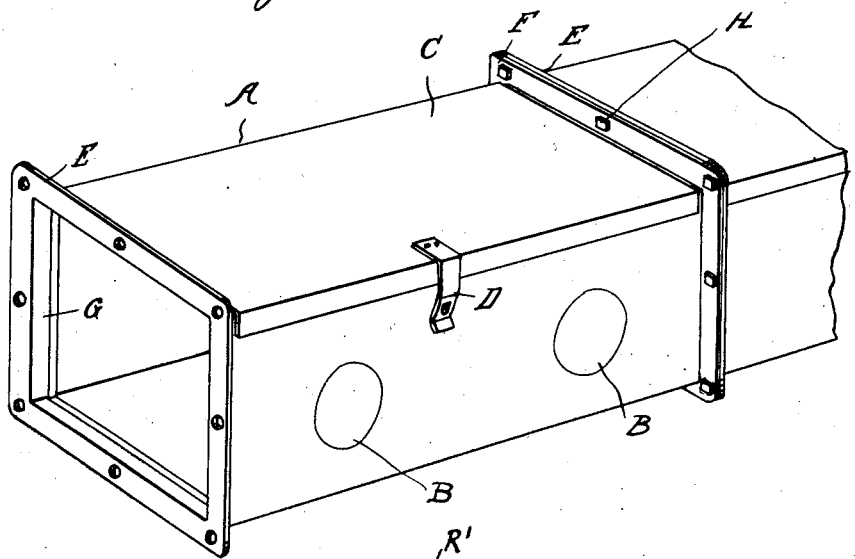
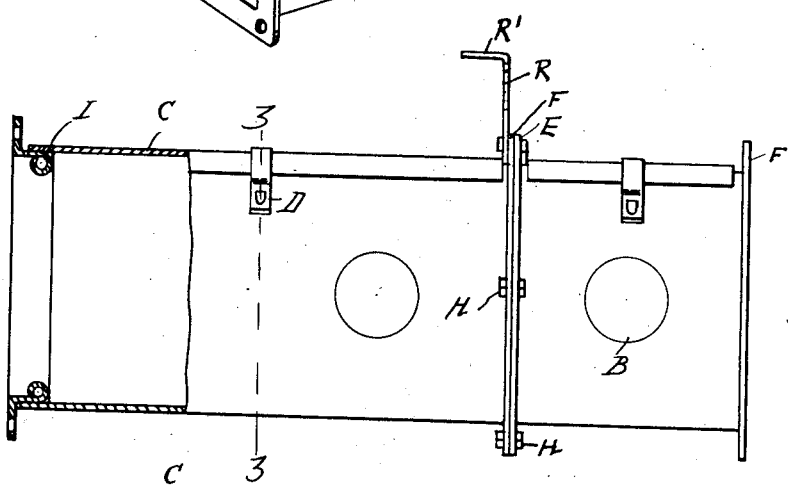
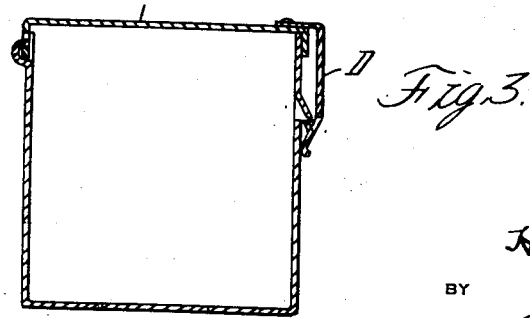
INVENTOR
Harrison J. L. Frank
BY
Sivan and Fry
ATTORNEYS

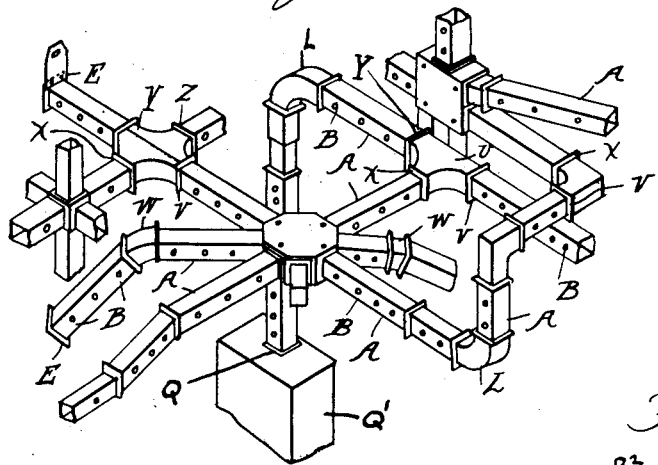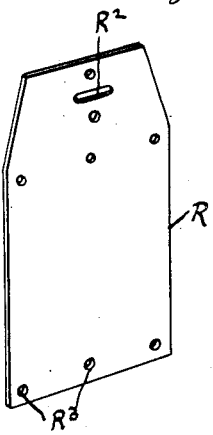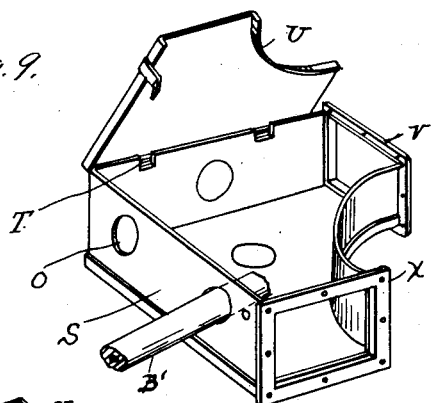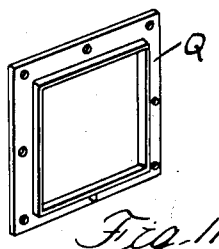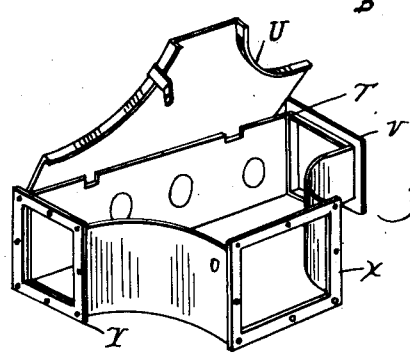

Jan. 8, 1935.  H. J. L. FRANK  1,986,965
WIRING DUCT AND FITTINGS
Filed Sept. 26, 1929  3 Sheets-Sheet 3
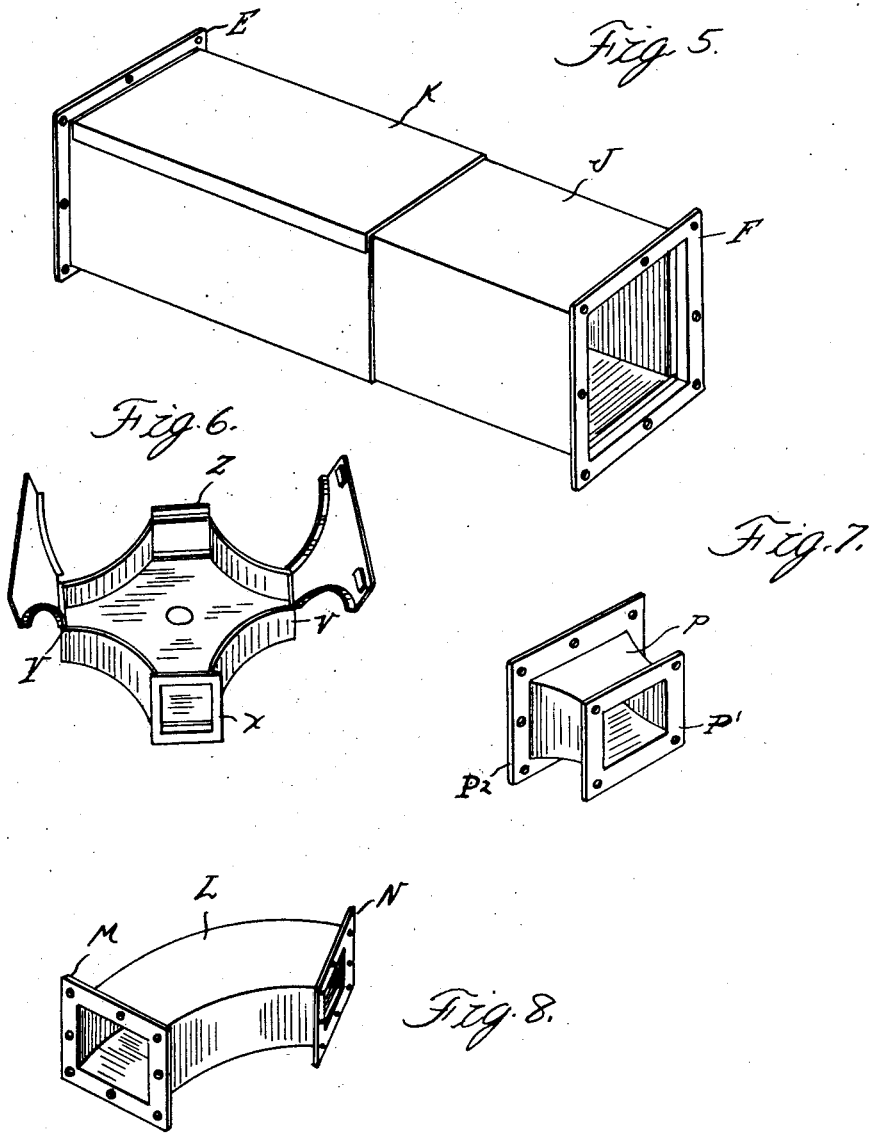

Patented Jan. 8, 1935

1,986,965

UNITED STATES PATENT OFFICE 1,986,965

WIRING DUCT AND FITTINGS

Harrison J. L. Frank, Highland Park, Mich., assignor to Bulldog Electric Products Company, Detroit, Mich., a corporation of West Virginia Application September 26, 1929, Serial No. 395,259

4 Claims. (Cl. 247—3)

This invention relates to wiring troughs or conduits, and has for its object an improved organization of parts especially adapted for installation in a factory building or similar structure, where, for reasons of access or rearrangement subsequently to the construction of the building, the electric wiring or power cables are positioned spacedly with reference to either the walls or the roof, and yet which it is desirable for obvious reasons to adequately protect against careless or unintentional touching. The accessibility of the trough or duct makes splicing, tapping, or other changes in the wiring, or additional installations thereof a matter of great ease and of economy in the matter of time.

In the drawings:

Figure 1 is a perspective of a section of duct or trough element, bringing out particularly the flanges at the ends of the meeting sections, by means of which the latter may be structurally united into a continuous trough of desired length, with a minimum of effort.

Figure 2 is a partly sectional elevational view thereof.

Figure 3 is a sectional elevational view taken along the line 3—3 of Figure 2, and looking in the direction of the arrows there shown.

Figure 4 is an assembly perspective designed to bring out the possibilities and adaptability of my improved construction under a variety of structural and space limitations.

Figure 5 is a perspective bringing out particularly the possible telescoping feature of one form of my invention.

Figure 6 is a perspective of a four-way union or junction box adapted to facilitate some of the structural tie-ups and adaptations illustrated in perspective Figure 4.

Figure 7 is a perspective of a coupling, bringing out the possibility of uniting the meeting ends of two duct sections which are of variant cross sectional size.

Figure 8 is a perspective of an elbow duct for effecting the turning of the cable enclosure about a corner or angle.

Figure 9 is a perspective of a corner elbow for my improved duct construction.

Figure 10 is a similar perspective of a T duct.

Figure 11 is a perspective of a flanged bushing, by means of which the end of a duct section entering a panel box or other fitting may be prevented from scraping or otherwise injuring the cables at that point.

Figure 12 is a partly sectional view of a possible modified or alternative means for uniting the meeting flanged ends of adjacent duct sections.

A indicates a duct or shell, preferably of rectangular cross-sectional contour, at selected portions along whose walls may be provided knockout holes B for entering conduits or cables B' and the top wall C of whose shell may, if desired, be hinged and held in place by a suitable clasp, as D. This shell, whether made thus or in plain rectangular form without a hinged side, may be supplied in desired stock lengths, at each end of which is secured a flange member, as E or F, which not only serves to structurally reinforce the ends of the walls of the conduit by means of its internally extending web G, but as well affords a means of quick and firm correlation of several trough sections, by means of bolts H passed through suitable holes in the meeting external web portions in the adjacent flanged web elements, as E and F. The inner web or flanged portion G may be secured to the end of the trough wall in any desired manner as, for example by welding or by the beading I, brought out prominently in cross section in Figure 2, which latter serves additionally as a protection against harmful scraping of the cables when positioned therein.

While Figure 1 illustrates plain trough sections, Figure 5 illustrates a slight modification, which it might sometimes be advisable to employ, in that in the outer trough section, as K, there telescopes an inner trough section, as J, so that, without cutting of the standard trough lengths as furnished, variations in the distance between the meeting ends of trough sections which are united by their flanges E and F in the manner already described may be dealt with, the slight difference between the internal measurements of the telescoping trough section J and the receiving trough section K being negligible as regards the protection of the included cables.

If a straight-away trough only is required, this may be built up by correlation of the suitable number of sections whose individual length totals the distance to be spanned, but if a curve is encountered, or a corner is to be rounded, the interposition between two straight-away trough sections of a corner elbow, such as shown at L in Figure 8, is often desirable, this member being provided at its ends with flanges M and N similar and complementary to the flanges E and F on the straight-away sections already described. And if for any reason a reduction in the cross-sectional size of one trough section as compared with its adjacent one is desired, this may be effected by means of the adapter element P shown in Figure 7, at either end of whose tapering wall portions are provided variantly sized flange elements as P' and P² which correspond respectively with the size of, and bolt hole perforations in, the terminal flanges of the straight-away trough members which the adapter is designed to connect.

In Figure 4 I have shown perspectively an assembly of variant trough or duct members, wherein, in addition to straight-away sections of various lengths, are associatedly shown the elbow and adapter members already described, as well as various forms of crossing elbow and T boxes such as are shown perspectively in Figures 6, 9, and 10. These latter, though functioning when closed in the same manner as the elbow member L illustrated in Figure 8, and a corresponding cross or T member, are also adapted to serve as pull boxes, in that the top portion of the body shell is hinged as, for example, at T in Figures 9 and 10, so as to give access, when the cover U is raised, to the conduits or cables passing through the body of the box S, which, like the straight-away sections, may, if desired, be provided with knock-out holes O, as well as the terminal correlating flanges already described. In the case of the corner elbow of this type illustrated perspectively in Figure 9 there will of course be two such correlating flange elements, as V and X, whereas in the perspective Figure 10 which illustrates a T there will be three such flanges as V, X, and Y, and in the case of the four-way or cross box illustrated in Figure 6 there will be four such flanges as V, X, Y, and Z. It wi'l be obvious that any suitable and desired assortment of the various elements described and herein illustrated may be used in even greater variety than is shown in perspective Figure 4, including such variances as the use of elbows of other than 90° angularity, as brought out particularly at W in Figure 4.

The utility of the bushing illustrated in perspective Figure 11 is also brought out at Q in the lower portion of Figure 4, where a straight-away duct section is shown leading into a panel box or similar fitting Q'.

The suspension of the duct from structural beams or from a ceiling may be effected in any desired manner, even by wires or by plain metal strips or angle iron pieces. I have, however, illustrated at R in Figure 12 a preferred medium for accomplishing this, consisting of a metal slab or plate of suitable size provided at its top with a suitable perforation R² and adjacent its bottom edge with holes R³ which are positioned so as to register with the bolt holes in the end flanges of the individual conduit sections, through which the correlating bolts may also be passed in the manner shown in Figure 2 so that the body of the plate extends thereabove, toward the ceiling or supporting beam. In Figure 2 I have shown the top edge of this supporting plate R overbent as at R' in case it proves more convenient to have the upper edge of the plate thus contoured for attachment to a supporting beam or ceiling.

Since it will be obvious that the angular turns in the duct system as a whole, will sometimes be in vertical planes as well as in horizontal planes, it is preferable to make the straight-away duct sections cross-sectionally square rather than with two sides longer than the other two sides, in order that the flanges of the elbow and T fittings required therefor may fit the corresponding terminal flanges of the ducts without the necessity of having additional and special adapter members.

While for many installations the structural integration of the initially separate duct sections, whether straight-away, elbowed or T'd, may be satisfactorily effected by the bolt members described, it will of course be obvious that in place thereof some such overengaging binding strip as the cross-sectionally U-shaped member shown in Figure 12 could be substituted for the bolts, without departure from the spirit of my invention.

What I claim is:

1. In a conduit system, a duct having an open end and a removable side, and a polygonal collar in said end having lip portions in said duct provided with rolled or beaded edges, and having flanges outside of and transverse to the duct.

2. A duct run of the character specified including duplicate, open end, sheet metal duct sections, and fittings between the sections, the sections and the fittings having in their ends collars separate from and integrally secured thereto and having cooperating flanges permitting the sections and fittings to be joined by means outside of them, the sections and the fittings having closely spaced "knockouts" and movable covers of large area, these permitting manual access to the interior of the duct run at all points, for pulling of the wires therein, and also for permitting wires passed through selected "knockout" holes to be connected to those in the run, the collars having smooth internal collar-strengthening beads to prevent abrasion of the wires in the duct run and to prevent overcrowding of the run by limiting the number of wires to be placed therein.

3. A duct run of the character specified including duplicate, open end, sheet metal duct sections, and fittings between the sections, the sections and the fittings having in their ends collars separate from and integrally secured thereto and having cooperating flanges permitting the sections and fittings to be joined by means outside of them, the sections and the fittings having closely spaced "knockouts" and movable covers of large area, these permitting manual access to the interior of the duct run at all points, for pulling of the wires therein, and also for permitting wires passed through selected "knockout" holes to be connected to those in the run, the collars having smooth internal collar-strengthening beads to prevent abrasion of the wires in the duct run and to prevent overcrowding of the run by limiting the number of wires to be placed therein, the collars being in the form of an equilateral polygon, and provided with cooperating holes symmetrically disposed about the longitudinal and central axis of the adjacent part of the run, through which holes the joining means aforesaid may be passed.

4. A conduit duct portion having end collars provided with lip portions extended into said duct portion to be secured thereto, and having flanges extending transversely to and outside of said duct, said lip portions having relatively smooth-surfaced transverse ribs formed as beads thereof and projecting into the duct passage adjacent the inner edges of the lip portions of said end collars.

HARRISON J. L. FRANK.